United States Patent [19]

Leuer

[11] Patent Number: 4,921,661
[45] Date of Patent: May 1, 1990

[54] SEGMENTED SADDLE-SHAPED PASSIVE STABILIZATION CONDUCTORS FOR TOROIDAL PLASMAS

[75] Inventor: James A. Leuer, Encinitas, Calif.

[73] Assignee: The United States of America as represented by the United States Department of Energy, Washington, D.C.

[21] Appl. No.: 431,365

[22] Filed: Nov. 3, 1989

[51] Int. Cl.$^5$ .............................................. G21B 1/00
[52] U.S. Cl. .................................. 376/136; 376/142; 376/146
[58] Field of Search ............... 376/136, 143, 142, 150, 376/146

[56] References Cited

U.S. PATENT DOCUMENTS

| | | |
|---|---|---|
| H24 | 2/1986 | Kugel et al. |
| 3,257,284 | 6/1966 | Post |
| 3,663,361 | 5/1972 | Yoshikawa |
| 3,664,921 | 5/1972 | Christofilos |
| 3,702,163 | 11/1972 | Furth et al. |
| 4,065,350 | 12/1977 | Sheffield |
| 4,073,680 | 2/1978 | Kelley |
| 4,330,864 | 5/1982 | Ohyabu |
| 4,476,085 | 10/1984 | Jardin et al. |
| 4,663,108 | 5/1987 | Carlstom |
| 4,696,781 | 9/1987 | Bourque |

OTHER PUBLICATIONS

9th Symp. Eng. Prob. of Fusion Research, Chicago, Ill., 10/81, Paper 5E-04, pp. 1383-1389, Winkler et al.
9th Symp. Eng. Prob. of Fusion Research, Chicago, Ill., 10/81, pp. 1650-1653.
Fusion Technology, vol. 15, No. 2, Part 2A, 3/89, 489-494, Leuer.

Primary Examiner—Harvey E. Behrend
Attorney, Agent, or Firm—Clifton E. Clouse, Jr.; Roger S. Gaither; William R. Moser

[57] ABSTRACT

A large toroidal vacuum chamber for plasma generation and confinement is lined with a toroidal blanket for shielding using modules segmented in the toroidal direction. To provide passive stabilization in the same manner as a conductive vacuum chamber wall, saddle-shaped conductor loops are provided on blanket modules centered on a midplane of the toroidal chamber with horizontal conductive bars above and below the midplane, and vertical conductive legs on opposite sides of each module to provide return current paths between the upper and lower horizontal conductive bars. The close proximity of the vertical legs provided on adjacent modules without making physical contact cancel the electromagnetic field of adjacent vertical legs. The conductive bars spaced equally above and below the midplane simulate toroidal conductive loops or hoops that are continuous, for vertical stabilization of the plasma even though they are actually segmented.

5 Claims, 3 Drawing Sheets

SEGMENTED SADDLE-SHAPED PASSIVE STABILIZATION CONDUCTORS FOR TOROIDAL PLASMAS

The Government has rights in this invention pursuant to Contract No. DE-AA03-84SF00100 awarded by the United States Department of Energy.

BACKGROUND OF THE INVENTION

The invention relates to a plasma generation and confinement system of a toroidal types, and more particularly to a method and apparatus for providing toroidally segmented passive conductors for stabilizing vertical motion of the plasma in a large toroidal vacuum chamber lined with modules which are segmented in the toroidal direction. FIGS. 1a and 1b, which illustrate the present invention in a representative environment, show cross-sectional views of a tokamak device with only major components. The motion of the plasma that requires stabilization is referred to as being vertical because, for small displacement of the plasma along the vertical axis, the plasma is unstable and will move further from the center of the device in a vertical direction when the device is oriented as shown in FIG. 1a.

Tokamak systems for plasma generation, confinement and control generally have a dual-function stabilization system, namely a passive inner layer of electrical conductors located close to the plasma surface and an active outer layer of coils. Illustrative of such plasma generation systems is the toroidal pinch plasma confinement system of the tokamak configuration shown in U.S. Pat. No. 4,330,864 titled DOUBLE LAYER FIELD SHAPING SYSTEMS FOR TOROIDAL PLASMAS. In that system, a large toroidal vacuum chamber is made of conductive material providing a path for induced current to flow in a horizontal toroidal direction in response to any vertical motion of the plasma. The induced toroidal currents in the wall tend to provide passive stabilization to vertical displacements of the highly elongated plasma in the chamber. Actively controlled coils provide the appropriate poloidal fields required to shape the plasma cross section, position the plasma in the vacuum vessel chamber, and provide magnetohydrodynamic (MHD) stability of the plasma in the chamber. Also provided around the chamber are toroidal field coils which establish an azimuthal magnetic field for stable plasma confinement.

Tokamak experiments show increased performance with increased plasma current. (J. C. DeBoo, et al., "Doublet III Operating Regimes with Improved Energy Confinement," Nuclear Fusion, Vol. 26, No. 2 (1986) p. 211). In the next-generation tokamak reactor devices, increased plasma current is being proposed to provide the plasma confinement required to reach ignition. (N.S. Uckan, "Relative Merits of the Size Field & Current on Ignited Tokamak Performance," Fusion Technology, Vol. 14, September 1988, p. 299). Plasma shaping, especially plasma cross section elongation, is viewed as one of the best means for obtaining higher plasma current. Generally plasma generation and confinement systems of the toroidal type are adapted to provide an elongated plasma. However, the vertical stability properties of a plasma degrade with elongation, and this greatly increases the requirements on the passive and active elements used to stabilize this motion. Reactor geometry also restricts the ability to place passive elements near the plasma, and hence, the passive stability characteristics of highly elongated plasmas are an important consideration in the design of next generation tokamak reactor systems.

In a study by the present inventor, the passive vertical stability properties of highly elongated plasmas are investigated and an assessment is presented on the impact of this passive stability on the next generation tokamaks. (J. A. Leuer, "Passive Vertical Stability In The Next Generation Tokamaks," Fusion Technology, Vol. 15, No. 2, Part 2A, pp. 489–494, March 1989). In particular, an early variant of an ITER (International Thermonuclear Experimental Reactor) configuration proposed by the United States is used as a baseline to evaluate the impact of plasma elongation on its plasma current carrying capability and on its vertical stability properties. That published study presents a methodology which predicts the stability characteristics of a plasma equilibrium moving vertically within a set of toroidally continuous resistive elements. Results were presented which relate plasma elongation and passive element properties to stability margin and vertical growth rate.

PASSIVE STABILITY

Plasma with elongations of 1.2 and above are vertically unstable and when displaced vertically will move away from the neutrally stable position (V. S. Mukhovatov and V. D. Shafranov, "Plasma Equilibrium in a Tokamak," Nucl. Fusion 11 (1971)). Stabilization of highly elongated plasmas is possible only with the inclusion of passive current-carrying elements. Without passive stabilization, the plasma would displace vertically on the Alfvèn timescale (sub-millisecond). Passive conductors can increase this time constant to a range where active control of the plasma is possible. The passive stability system must be capable of providing a stabilizing force ($F_s$) equal and opposite to the destabilizing force ($F_d$). The passive elements must be located close to the plasma and must be toroidally continuous or, in accordance with the present invention, connected with vertical conductors to allow for counter rotating currents in the upper and lower planes. Present experiments typically rely on a toroidally continuous, tightly fitting vacuum vessel to provide stabilization. Because of the need for blankets, shields, and sector-type assembly, this will be difficult to achieve on reactor type fusion devices.

STABILITY PARAMETER AND GROWTH RATE

The stability parameter (f) and the growth rate ($\gamma$) can be used to describe the performance of the passive stabilizing system. The stability parameter charcterizes the margin relative to uncontrollable vertical motion and the growth rate characterizes the growth rate of the unstable vertical motion. In terms of plasma displacement for small displacements from the neutral position, an initial displacement $z_o$ will grow exponentially as $z = z_o e^{\gamma t}$. As an example, design contraints of $f > 1.5$ and $\gamma < 100 s^{-1}$ are used in reactor designs. This constraint reflects a 50% margin against vertical movement at the Alfvèn time scale and requires the exponential growth rate to be less than $100 s^{-1}$ to allow for reasonable active power supply requirements.

For a plasma characterized by multifilaments and a multiconductor passive stabilization system, the stability parameter, which is the negative of the ratio of the stabilizing to destabilizing force gradient, is a complex function of the geometry of the system. It can be expressed as:

$$f = \frac{F_v}{F_d} = \frac{[I_p]'^T[M'_{p,s}][M_{s,s}]^{-1}[M'_{s,p}][I_p]}{[I_p]^T[M''_{p,p}][I_p]} \quad (1)$$

where I's are current vectors and M's are inductance matrices. The respective subscripts p, s, and pf refer to plasma, stabilization conductors, and poloidal field coils. The notation $[\ ]^T$ refers to the transpose of a matrix, $[\ ]^{-1}$ refers to the inverse of a matrix, and (') refers to differentiation with respect to the vertical neutral plasma position.

The growth rate can be approximated for a simple system by:

$$\gamma = \frac{1}{\tau_s} \cdot \frac{1}{(f-1)} \cdot (f > 1) \quad (2)$$

where $\gamma$ is the plasma growth rate and $\tau_s$ is the shell time constant associated with the vertical motion of the plasma.

For a multifilament, multiconductor system, the growth rate is represented by the solution to an eigenvalue problem with the circuit equations, constrained by the plasma vertical force-balance equation, as the characteristic equations. The circuit equation for a passive system is represented as:

$$[M_{s,s}][\dot{I}_s] + [\dot{M}_{s,p}][I_p] + [R_{s,s}][I_s] = 0 \quad (3)$$

The force balance equation is:

$$m_p \dot{v}_p = 0 = F_d z_p + [I_p]^T [M'_{p,s}][I_s] \quad (4)$$

where $m_p$, $z_p$ and $v_p$ are plasma mass, position and velocity, respectively and the ($\cdot$) represents differentiation with respect to time. The coil matrices ($M_{s,s}$ and $R_{s,s}$) include contributions from external components in their diagonal elements. In the case of the present invention, the external inductance and resistance of vertical legs of saddle current conductor loops are added to the diagonal elements. The inertia term, $m_p v_p$, has been set to zero in accordance with the assumptions of a massless plasma. In the above equations, plasma current is held constant.

The above formulation can be used to optimize the location of the passive conductors and to predict the vertical stability properties of a stabilizing structure. The stability parameter (f) can be used as a figure-of-merit in evaluating a particular passive conductor system. The growth rate can also be used as a performance parameter; however, the stability parameter defines a limit below which controllable plasma stability cannot be achieved, while growth rate, as determined from the passive sysem L/R characteristics, affects only the active system requirements.

The optimum conductor location for a given equilibrium can be determined by using a single conductor to locate the maximum value of the stability parameter. FIG. 2 shows contour plots of the stability parameter for a typical highly elongated plasma. In this plot, the passive system consists of a pair of toroidaly continuous conductors or coils symmetrically located above and below the midplane. The stability parameter associated with the coil location is plotted as the contour value. Increasing contour values represent a better passive conductor location. For realistic coil placement, the optimum location for passive elements is just outside the plasma on a poloidal angle of approximately 70° from the plasma center. To achieve a stability margin of 1.5 for this equilibrium, a single conductor at this location would have to be placed on the plasma surface.

In the next generation tokamaks, it is expected that the toroidal plasma chamber will be lined with a shield or blanket of suitable material to absorb the high energy neutrons produced by the nuclear reaction occurring in the plasma. This blanket should be close to the plasma to allow for efficient capture of the neutrons leaving the plasma and for protection of the coils producing the plasma confining magnetic fields. The geometry of the toroidal field coils and the need to maintain the shielding blanket make it desirable to have a non-continuous toroidal blanket, i.e., to have the blanket made up of modules that constitute sectors that conform to the outboard wall of the toroidal chamber. Because of the lack of electrical contact between adjacent blanket sectors, the blanket close to the plasma may not be relied upon to provide passive stabilization in the same manner s a conductive vacuum chamber wall is used in previous designs. In addition, the inclusion of the blanket close to the plasma requires that the vacuum vessel be placed far from the plasma where its stabilizing influence on the plasma vertical stability is greatly reduced, as can be seen in FIG. 2 by the reduction in contour value as the passive element is moved away from the plasma surface. As a consequence, currents that may be induced in the wall of the vacuum chamber by motion of the plasma will not be sufficient to provide for good passive stabilization. It is therefore desirable to restore good passive vertical stabilization by effectively providing toroidal current paths for passive vertical stabilization.

SUMMARY OF THE INVENTION

An object of this invention is to provide a passive vertical stabilization system on the inside surface of a toroidally segmented modular blanket that lines a plasma vacuum chamber.

A further object is to provide passive saddle-shaped conductor loops on an annular array of individual blanket modules that line a toroidal plasma vacuum chamber, each saddle-shaped conductor loop being centered on a midplane of the toroidal chamber with horizontal conductive bars on the upper half of the blanket module, horizontal conductive bars on the lower half of the blanket module, and vertical conductive legs positioned on opposite sides of the modules for so connecting the upper and lower conductive bars as to provide a plurality of closed saddle-shaped conductor loops with current through horizontal conductive bars in the upper half in one direction, current through horizontal conductive bars in the lower half in the opposite direction, and return current between the upper and lower conductive bars through the vertical legs with the direction of current resulting from the direction of the plasma motion tending to retard the vertical motion of the plasma. The conductive bars above and below the midplane simulate toroidal conductive loops or hoops that are continuous even though they are actually segmented, while vertical legs of adjacent modules are so juxtaposed without any physical contact that the magnetic field of adjacent return legs cancel.

The novel features that are considered characteristic of this invention are set forth with particularity in the appended claims. The invention will best be understood

BRIEF DESCRIPTION OF THE DRAWINGS

FIG. 1b illustrates a midplane section of assembled blanket modules in the vessel shown in FIG. 1a.

DETAILED DESCRIPTION OF THE INVENTION

Figure 1A:
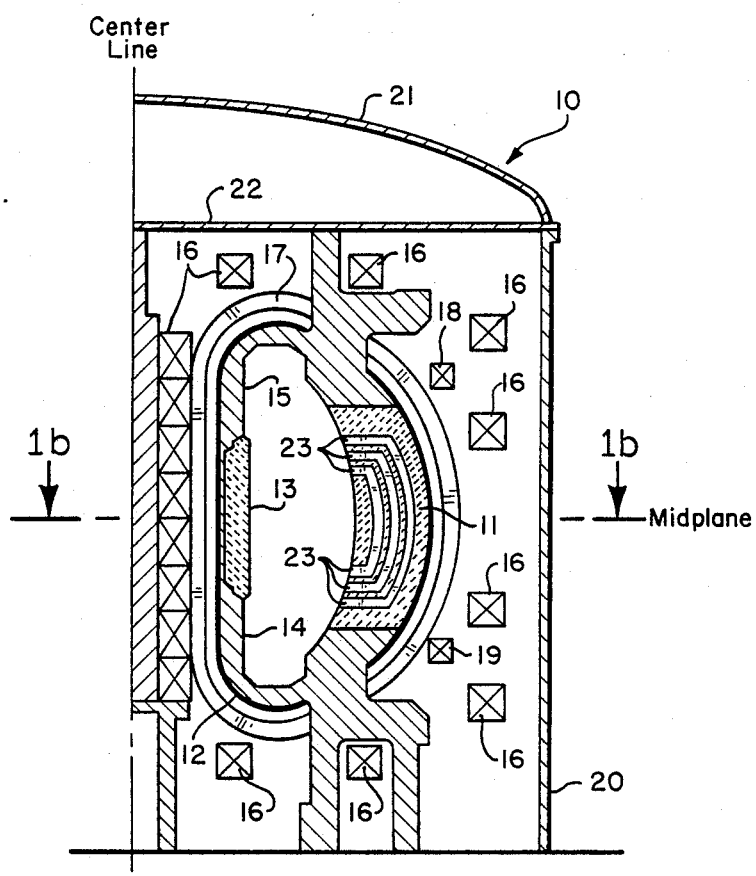
FIG. 1a illustrates a vertical sectional view of a typical next-generation fusion reactor having a plasma shaping system (schematically illustrated) for obtaining higher plasma current, and having a modular blanket between the plasma and the outboard wall of the plasma toroidal vessel.

Referring to FIG. 1, a tokamak experimental reactor 10 is illustrated schematically in a vertical sectional view to show how curved blanket modules 11 are placed inside the wall of a metal plasma vacuum vessel 12 as a shield to protect other parts of the reactor from damage due to radiation of neutrons. Inner blanket modules 13 are positioned opposite the outer blanket modules that line the vessel 12, which is represented by a heavy line extending from a lower support shield 14 to an upper support shield 15 around the blanket modules 11 and 13. The support shields 14 and 15 may be made from the same material as the blanket modules 11 and 13, or some other material, and may each be provided in two parts, one part inside and one part outside the vaccum vessel 12, in which case the vacuum vessel would be continuous from the outboard wall to the vertical cylindrical wall in the center and the part of each support outside the vacuum vessel could be made of steel. In either case, the toroidal vacuum vessel 12 and shield blanket structure 11, 13, 14 and 15 have a D-shaped cross section for containing a vertically elongated plasma.

The plasma cross section is shaped by horizontal poloidal field coils 16 represented by eight rectangles (with an X inside each of the rectangles) stacked inside the cryogenic vacuum vessel comprised of elements 20, 21 and 22 around the outside of the inner vacuum vessel 12, and sixteen toroidal field coils 17 which closely conform to the D-shaped cross section of the inner vacuum vessel 12 around the inner modules 13 and outer modules 11. In addition to the poloidal and toroidal field coils, there may be an active stabilization coil 18 above the midplane, and an active stabilization coil 19 below the midplane. Current from an outside source to these active stabilization coils is servo controlled to stop vertical motion of the plasma in the vacuum chamber 12. The currents in the coils 18 and 19 are always in opposite directions and are dependent upon the direction of plasma motion. Their amplitude is dependent upon the location and rate of the plasma motion.

A cylindrical housing 20 surrounds the plasma vessel and coils, and is capped with a dome 21 over a horizontal structure 22. In practice, a high vacuum is provided in the vacuum vessel 12 (through ducts not shown) while a lower vacuum and cryogenic containment is provided in the space enclosed by the housing 20 and dome 21 (through ducts not shown). It may be desirable to circulate an inert gas, such as nitrogen, within the cylindrical housing 20 and dome 21 for cooling the space in an experimental reactor.

Figure 1B:
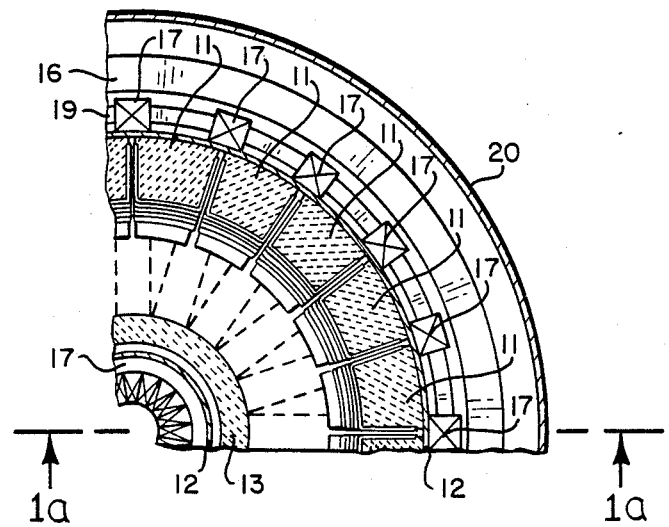
Figure 2:
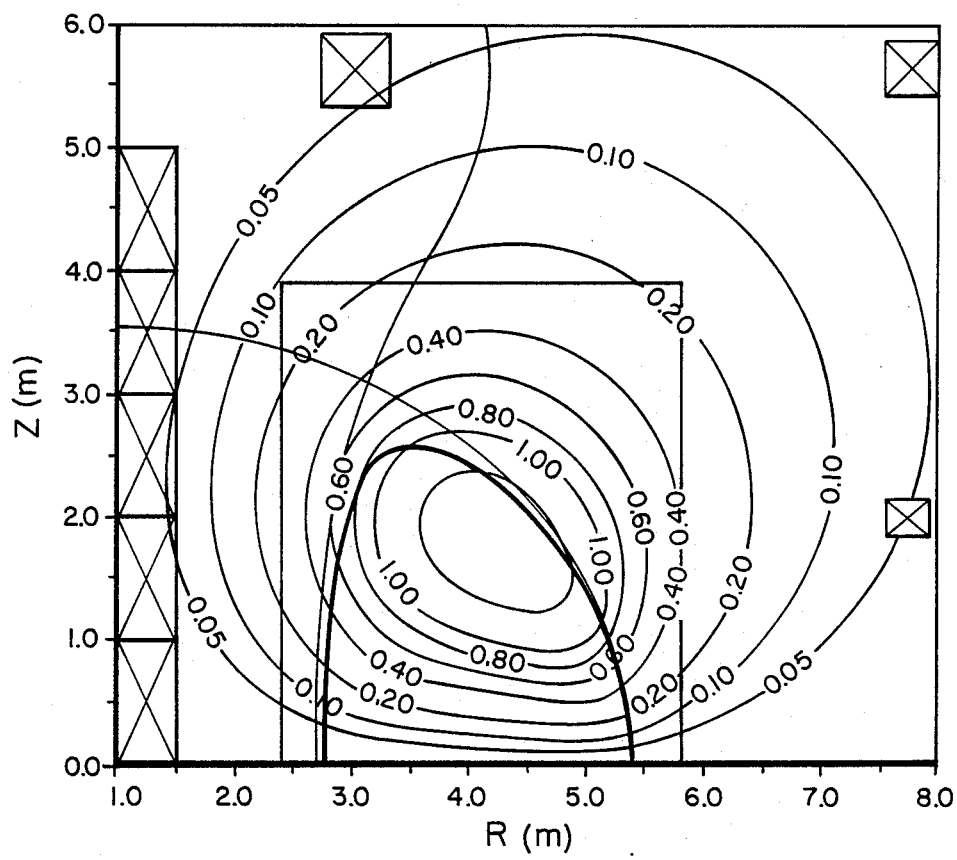
FIG. 2 is a graph which shows contour plots of the stability parameter for a typical highly elongated plasma.
Figure 4:
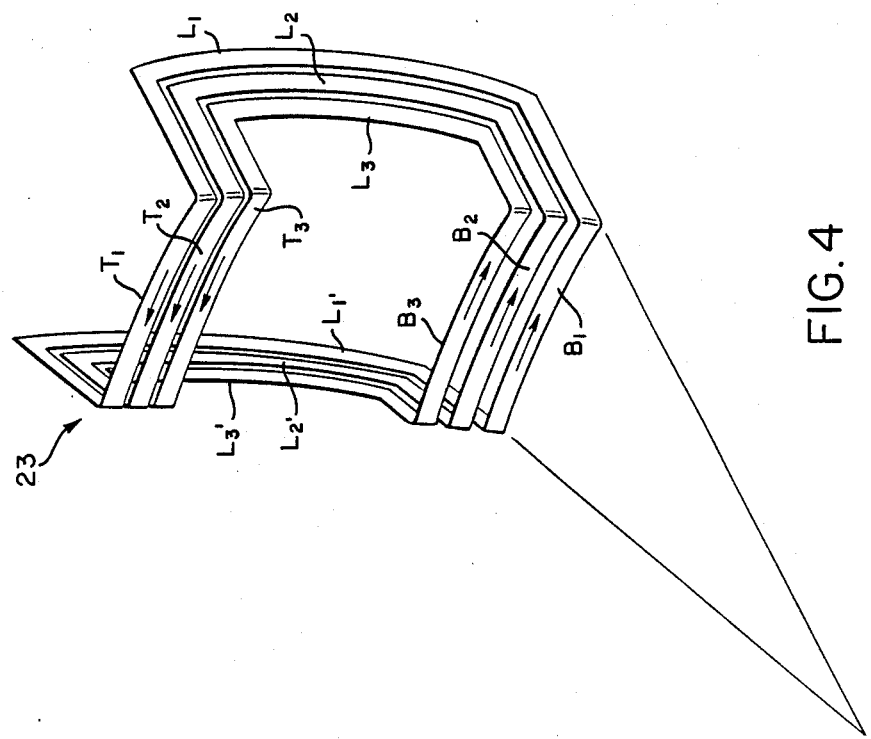
FIG. 4 is a perspective view of three concentric saddle-shaped conductor loops placed on the face of each blanket module shown in FIG. 3.
Figure 3:
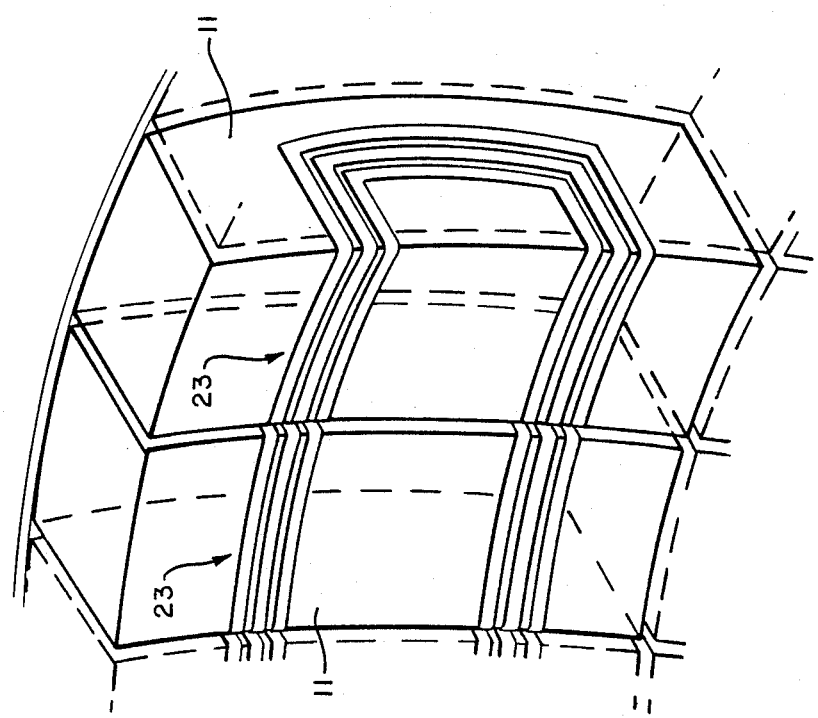
FIG. 3 illustrates three passive stabilization saddle-shaped conductor loops or two adjacent blanket modules shown in FIGS. 1a and 1b.

In accordance with the present invention, saddle-shaped passive stabilization conductor loops 23 are placed on the modules 11 shown in FIGS. 1a and 1b that line the plasma vessel wall 12 as more clearly shown in FIG. 3. Topologically, the current flows in saddle-shaped conductor loops with the top and bottom conductor bars ($T_1$, $T_2$, $T_3$ and $B_1$, $B_2$, $B_3$) connected anti-symmetrically in series as shown in FIG. 4. The vertical side conductors or legs connecting the top and bottom conductor bars of each saddle-shaped conductor loop increase the overall inductance in the passive stabilization system but contribute nothing to the stabilizing forces on the plasma. In order to maintain a suitable stability margin as defined in Equation (1), this external inductance is kept to a minimum.

It should be noted that the passive stabilization conductor loops 23 are provided to minimize the external power required for the active stabilization coils 18 and 19 and not to replace them. It will become apparent from the following that the passive stabilization loops placed on the blanket module 11 to provide horizontal conductive bars above and below the horizontal midplane of the reactor, as shown in FIG. 1a, will function as though they were segments of continuos toroidal conductor hoops.

Only the front horizontal conductor bars $T_1$, $T_2$, $T_3$ and $B_1$, $B_2$, $B_3$ provide passive stabilization. Note that saddle-shaped conductor bars on adjacent sector modules placed around the entire inside of the vacuum vessel 12 will effectively simulate two continuous closed current paths, one continuous closed current path above the midplane of the reactor and a second continuous closed current path below the midplane of the reactor, with vertical legs $L_1$, $L_2$, $L_3$ and $L_1'$, $L_2'$, $L_3'$ providing return current between the top and bottom conductors for each segment of the effectively continuous toroidal hoop current paths. As noted above, the currents in the top and bottom hoops will always be in opposite directions. As the plasma tends to move vertically up in the vessel 12, the currents induced in the horizontal conductor bars will be as shown in FIG. 4, and as the plasma tends to move vertically down, currents reverse direction with the magnitude of the currents always in proportion to the rate of plasma vertical motion.

Plasma vessels which may use the present invention to advantage may include various of the elements of toroidal plasma confinement systems, and may have a noncircular plasma cross section of most any shape, typically elongated in a direction parallel to the axis of the toroidal plasma confinement system. In the plasma confinement system of FIGS. 1a and 1b, the blanket modules 11 lining the outer wall of the vessel 12 are formed with a compound curvature to fit the curvature of the vacuum vessel 12 in the particular outer wall location into which it is placed. Some minimum space is provided between adjacent modules not only to facilitate their removal when necessary, but more importantly to assure that vertical legs of saddle-shaped stabilization loops on adjacent modules do not make physical contact but are in close proximity to reduce the amount of external inductance which degrades the performance of the saddle loops in passively stabilizing the motion. That assures that the return currents of the condutor bars on the adjacent modules are not shunted from one module to another which allows for flux to penetrate the passive structure during plasma initiation.

For passive stabilization, toroidally continuous conductor loops are necessary as noted hereinbefore, but as also noted, such continuous conductors would be difficult to install when the wall of the plasma vessel 12 is lined with a modular blanket. The up/down antisymmetric vertical legs of the saddle-shaped conductor loops on the blanket modules make it possible for the current through the horizontal conductor bars of adjacent modules to simulate continuous toroidal conductive hoops, thereby to provide passive stabilization.

Electrical connections could be made between conductive bars of adjacent modules without vertical legs after the modules are installed in the device to form a continuous toroidal loop for current induced by the plasma vertical motion. However, this causes a number of problems which the saddle-shaped loops of the present invention eliminates. First, use of complete toroidal hoops restrict the initiation of plasma by distorting the magnetic fields produced by the poloidal field coils when the plasma discharge is initiated. During the plasma initiation phase of operation, the voltage present on a toroidally continuous loop will drive current in the same direction in the upper and lower toroidally continuous loops and this will in turn distort the fields in the region of the plasma and could prohibit the gas from discharging into a plasma. In the present invention, the polarity of the induced voltages during plasma initiation is opposite in the upper and lower horizontal conductors and accordingly no current can flow in the saddle-shaped stability loops. Second, a complete toroidal hoop would require the use of electrical connections which would have to be installed by remote handling equipment. Third, these toroidally continuous hoops would be inductively coupled to the plasma current; a rapid change in the plasma current would induce large currents in the toroidally continuous hoops and large forces on the hoops would result. Because of the requirement of equal and opposite current flow in the upper and lower horizontal conductors in the saddle-shaped loop of the present invention, the plasma current is uncoupled from the plasma current and rapid changes in plasma current will induce little or no current in the saddle-shaped loops for passive stability.

The vertical return legs between parallel bars of each saddle-shaped conductor loop are placed on the side of the blanket module, as shown in FIG. 3, and the modules are so juxtaposed that the magnetic field of adjacent return legs cancel. The upper and lower passive stabilization toroidal conductors formed by these saddle-shaped conductor loops are segmented and not continuous but are made to act as though they were continuous by the return legs of the saddle-shaped conductor loops on adjacent modules. Of importance in this invention is the close proximity of vertical legs of adjacent blanket modules witout physical contact, thus reducing the impedance to the flow of current in these legs, i.e., reducing the contribution of these legs to the passive system mutual inductance and resistance matrices as used in Equations (1 and 3) to describe the stability parameter, f, and the exponential growth rate.

Referring to FIG. 4, a saddle-shaped conductor loop is comprised of a plurality of concentric electrically continuous rectangular loops, typically three loops are shown, which are affixed to a blanket module shaped to fit a sector of the curved wall of a plasma vessel 12, as shown in FIG. 3. The top and bottom conductor bars $T_1$, $T_2$, $T_3$ and $B_1$, $B_2$, $B_3$ of the rectangular loops constitute parallel conductive segments at the top and at the bottom to make up segmented toroidal hoops. The sides of the rectangular loops clearly function as return legs for current between the three top conductive bars $T_1$, $T_2$, $T_3$ to the respective three bottom conductive bars $B_1$, $B_2$, $B_3$, thereby to effectively provide continuous induced toroidal current flow around elongated plasma in one direction above the midplane, and effectively provide continuous induced toroidal current flow around the elongated plasma in the opposite direction below the midplane whenever the plasma is in motion, up or down, with the direction of current related to the direction of motion and the amplitude of current proportional to the rate of motion to retard the plasma motion. Thus, modules with passive saddle-shaped conductor bars placed in a continuous horizontal toroidal array in the plasma vessel are not continuous due to the spaces between modules, but electrically the segmented horizontal conductive bars act as toroidally continuous conductors for stabilizing vertical motion of the plasma.

The number of horizontal conductor bars shown in FIG. 1a, 3 and 4 is representative. More conductor bars could be provided, or the conductor bars could all be combined into a single wide bar above and a single wide bar below the midplane of the reactor. The legs would then be combined into a single wide leg connecting the upper and lower conductive bars to provide a return path for the current which is induced in the horizontal bars by the vertical plasma motion.

The key to this saddle-shaped conductor loop for stabilizing action is the return currents paths through the vertical legs of the rectangular loop or loops. These return current paths will tend to produce electromagnetic fields perpendicular to the stabilizing electromagnetic fields of the bars, but the fields of the legs are small and will tend to be cancelled by fields of the legs in saddle-shaped conductor loops of immediately adjacent modules. The net result is therefore essentially only electromagnetic fields produced by the horizontal bars which retard vertical motion of the plasma. This passive stabilization system substitutes for the passive stabilization normally provided by the conductive wall of a vacuum vessel when it is not lined, i.e., when the conductive wall of the plasma vessel is toroidally continuous and very close to the plasma.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. In a toroidal plasma chamber lined with an annular array of shielding modules, said annular array being oriented in a plane perpendicular to the axis of said toroidal chamber and centered on said axis, and each module being centered on a midplane perpendicular to said axis, a passive stabilization system consisting of a saddle-shaped conductor loop on each module of said annular array of modules, each saddle-shaped conductor loop consisting of at least two conductive bars on the face of a module, said conductive bars being arrayed in parallel and perpendicular to said axis with one bar spaced above said midplane and one bar equally spaced below said midplane, said conductive bars being affixed to said face of said module, and two conductive legs, one conductive leg on each side of said module parallel to said axis for connecting ends of said two conductive bars to complete a conductive loop for induced current due to motion of plasma in said chamber in a direction parallel to said axis, with current in one conductive bar in a direction that tends to retard motion of said plasma, and current in the other conductive bar in a direction opposite current in said one conductive bar, and return current from each conductive bar to the other through said conductive legs.

2. A combination as defined in claim 1 wherein said conductive legs of adjacent modules in said annulr array are electrically isolated from each other to retain independent conduction of loop currents induced in saddle-shaped conductor loops of said adjacent modules by vertical motion of plasma, whereby electromagnetic fields produced by currents in juxtaposed conductive legs of adjacent modules will cancel.

3. In a large toroidal vacuum chamber for plasma generation and confinement lined with a toroidal blanket for shielding comprised of modules annularly arrayed along the inside of the outer wall of said vacuum chamber in the toroidal direction and saddle-shaped conductor loops on inwardly facing surfaces of said blanket modules, said saddle-shaped conductor loops being centered on a midplane of the toroidal chamber, said midplane being perpendicular to the axis of said toroidal vacuum chamber, with conductive bars on the face of each module above and below said midplane, and conductive legs on opposite sides of each module parallel to said axis to provide return current paths between conductive bars on opposite sides of said midplane, said conductive legs being provided on adjacent modules without making physical contact thereby to cancel the electromagnetic fields of adjacent vertical legs, whereby conductive bars spaced equally above and below said midplane simulate toroidal conductive loops that are continuous for stabilization motion of plasma parallel to said axis.

4. In a toroidal plasma chamber lined with an annular array of shielding modules, said annular array being oriented in a plane perpendicular to the axis of said toroidal chamber and centered on said axis, a passive stabilization system consisting of a plurality of saddle-shaped conductor loops on each module of said annular array of modules, each saddle-shaped conductor loop consisting of two horizontal conductive bars on the face of a module, said conductive bars of said loops being arrayed in parallel with spacing between two groups of bars of each module substantially greater than between bars of each group, said two groups being spaced on the face of said moudule an equal distance on opposite sides of said midplane, and two groups of vertical conductive legs of equal number on opposite sides of said module perpendicular to said midplane for connecting said two groups of conductive bars at both ends to complete a set of saddle-shaped conductor loops equal in number to the number of conductive bars in each group.

5. A combination as defined in claim 4 wherein conductive legs of adjacent modules are juxtaposed but not in physical contact with each other to retain independent conduction of loop currents induced in saddle-shaped conductor loops of said adjacent modules while electromagnetic fields of juxtaposed conductive legs on adjacent modules cancel.

* * * * *